J. S. THURMAN.
PNEUMATIC COTTON PICKING SYSTEM.
APPLICATION FILED JULY 13, 1908.
918,794.  Patented Apr. 20, 1909.
2 SHEETS—SHEET 1.
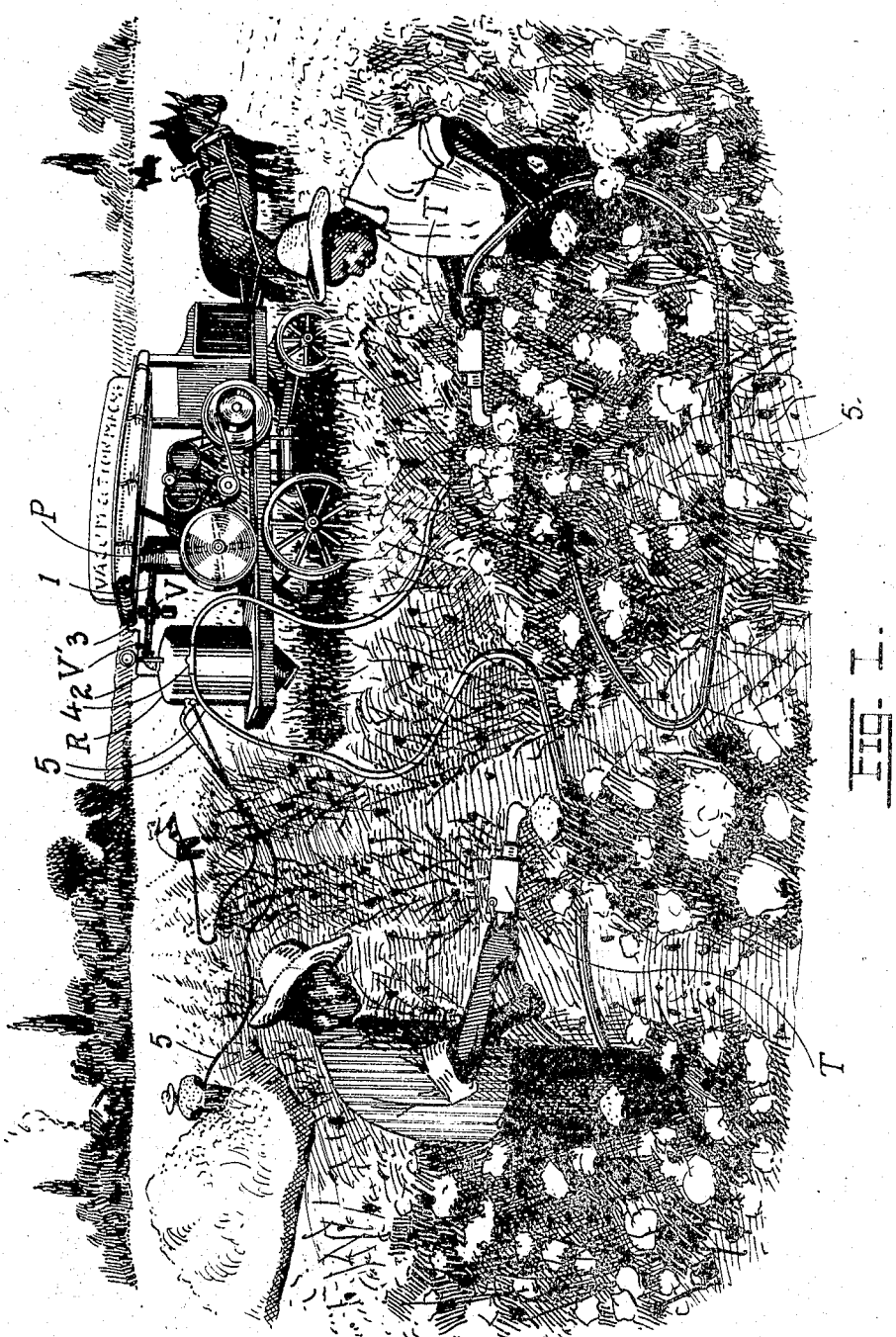
WITNESSES:
INVENTOR.
John S. Thurman
BY
ATTORNEY.

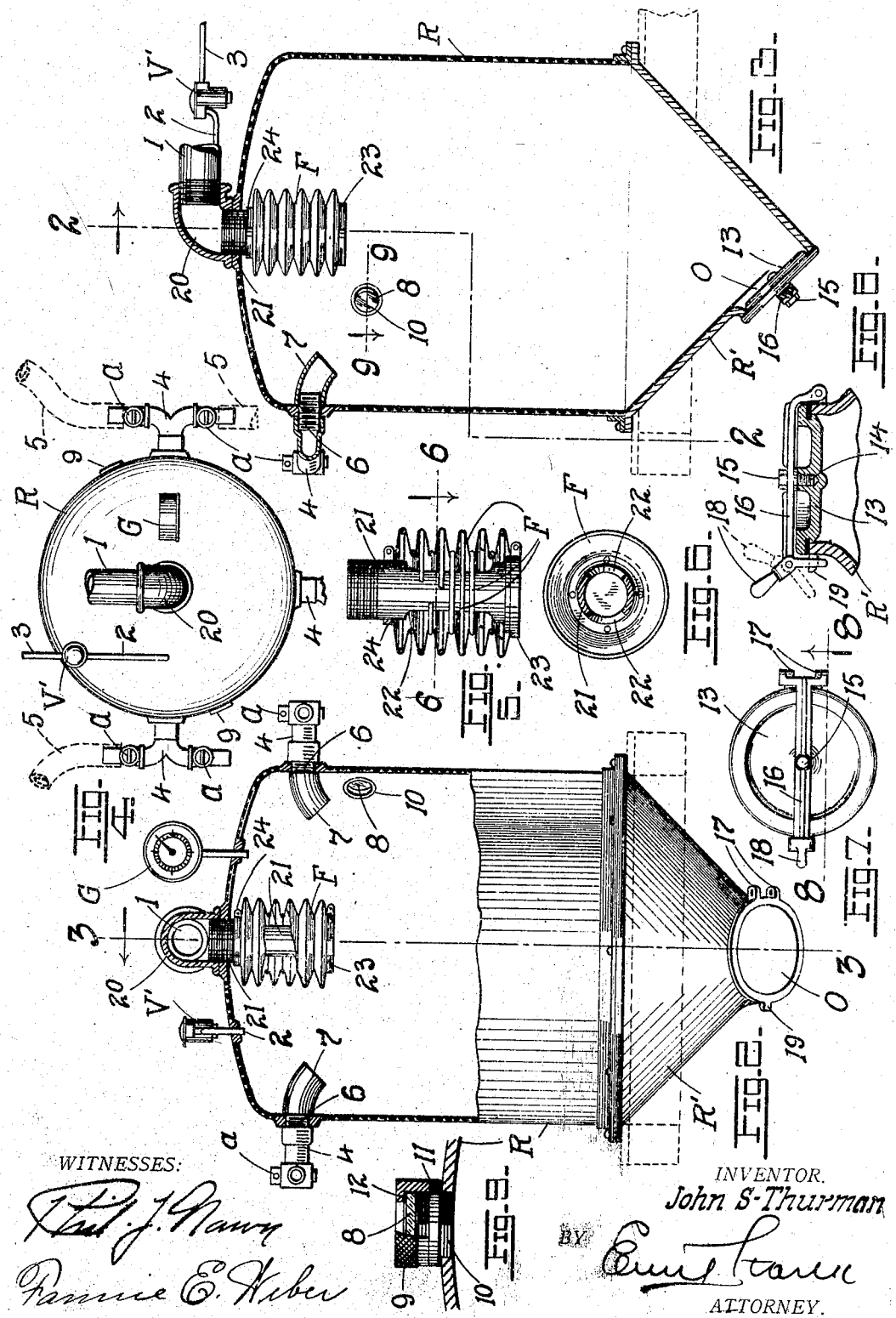

UNITED STATES PATENT OFFICE.

JOHN STROTHER THURMAN, OF ST. LOUIS, MISSOURI.

PNEUMATIC COTTON-PICKING SYSTEM.

No. 918,794.  Specification of Letters Patent.  Patented April 20, 1909.

Application filed July 13, 1908. Serial No. 443,270.

*To all whom it may concern:*

Be it known that I, JOHN STROTHER THURMAN, a citizen of the United States, residing at St. Louis, State of Missouri, have invented certain new and useful Improvements in Pneumatic Cotton-Picking Systems, of which the following is a full, clear, and exact description, reference being had to the accompanying drawings, forming a part hereof.

My invention has relation to improvements in pneumatic cotton-pickers; and it consists in the novel features of construction more fully set forth in the specification and pointed out in the claims.

In the drawings, Figure 1 is a general perspective showing the application of my improvement in the field; Fig. 2 is a combined vertical elevation and section of the vacuum tank or receptacle in which the cotton is deposited, the section being on the broken line 2—2 of Fig. 3; Fig. 3 is a vertical section on the line 3—3 of Fig. 2; Fig. 4 is a top plan of the receptacle or tank; Fig. 5 is an enlarged elevational detail of the screen or separator; Fig. 6 is a horizontal section on the line 6—6 of Fig. 5; Fig. 7 is an outer face view of the gate of the receptacle; Fig. 8 is a cross-section on the line 8—8 of Fig. 7; and Fig. 9 is an enlarged sectional detail on line 9—9 of Fig. 3 of one of the sight openings or windows with which the receptacle is provided.

The present invention has for its object the construction of appliances specially adapted to the picking of cotton by the pneumatic process, and particularly the vacuum method (as distinguished from the compressed air method), that is to say the method whereby the cotton is severed from the boll by the action of atmospheric air rushing into a vacuum created in the suction-head or tool which is applied to the cotton in the boll. The cotton once severed from the boll is carried by the action of the vacuum into a receptacle or low pressure reservoir from which the air is strained and drawn into or through the vacuum producing means, be the same a pump, injector, or a combination of the two. By the action of a vacuum every fiber of the cotton is drawn off the boll, absolutely preventing any loss whatsoever, an objection so inherent in the hand-picking process. When the receptacle has been filled, means are provided for quickly emptying the same into a paulin or cloth laid on the ground. The vacuum pump is mounted on a movable track and the receptacle is interposed between the pump, and the picking tool or suction-head which in turn is coupled to the receptacle by a line of hose reaching to any point in the field. The tool is held in the hand and passed from boll to boll until the necessary quantity of cotton is picked. While the suction-head must be specially constructed for the gathering of cotton, as distinguished from suction-heads or renovating tools employed in vacuum cleaning systems, it is also true that specially constructed receptacles must be availed of to intercept and collect the cotton in its passage toward the vacuum producing means. The suction-head is here illustrated in a general way, forming as it does the subject-matter of a distinct application for patent, but the vacuum receptacle or tank is here set forth in detail, and it is to this feature that the present invention is specifically directed. Its advantages will be best apparent from a detailed description thereof which is as follows:—

Referring to the drawings, P represents a vacuum-pump, between which and the portable suction-head or tool T is interposed a tank or receptacle R into which the cotton is directed and where it is deposited. In the pipe 1 connecting the pump with the receptacle is interposed a vacuum-control valve V, which regulates the work imposed on the pump, by the degree of vacuum in the tank R, said valve being in turn controlled by the pilot-valve V' connected to the tank and control-valve by the pipes 2 and 3 respectively. These features are merely referred to herein and not dwelt on in detail, forming as they do subject-matter of a separate application for patent.

Distributed about the peripheral walls of the cotton-receiving receptacle R, are a series of Y-shaped couplings 4 from the legs or members of which lead the suction-pipes or air-hose 5, 5, directly to the suction-heads T. The couplings are screwed to the screw-threaded nipples 6, which project a suitable distance into the receptacle to which inner ends are screwed the elbows or nozzles 7, the latter being inclined downwardly so as to direct the cotton toward the inclined bottom or hopper R' of the receptacle. To ascertain the condition of things within the receptacle at any time, I provide the vertical walls of the latter with windows located diametrically opposite one another so as to avail oneself of the light entering the receptacle therethrough, each window being composed of a glass (or equivalent transparent) disk 8 held in position by a milled screw-cap 9 which is screwed over the outer end of a hollow nipple 10 screwed into the wall of the receptacle, the cap being limited by the annular ring or flange 11 on the nipple, which ring in turn limits the distance the nipple is screwed into the receptacle wall (Fig. 9). A suitable packing ring 12 is interposed between the glass disk and the terminal flange of the screw-cap.

The cotton is discharged from the receptacle through an opening in one of the inclined walls of the hopper R', said opening being normally closed by a door 13 (preferably circular), the outer face of the door being provided with a socket 14 which receives a screw-bolt 15 by which the hinge-bar 16 passing diametrically across the door is secured to the latter. One end of this bar 16 is forked, the fork arms being hinged to the ears or lugs 17 formed about the door opening O, the opposite end of the bar having pivoted thereto the angular locking latch 18, one leg or arm of which is provided with an opening which engages the keeper 19 formed about the door-opening diametrically opposite the ears or lugs 17, 17. The keeper 19 is rounded on one face so that the latch arm may readily slip over it, whether in the act of locking or unlocking the door. The door when once released, obviously drops by gravity to an open position, allowing the cotton to discharge.

G, represents a vacuum gage as usual in these devices.

Depending from the roof of the receptacle, and coupling to the elbow 20 from which the eduction pipe 1 leads to the pump is a tube or pipe 21 provided with a series (two in the present case) of longitudinal peripheral slots or openings 22, the bottom of the tube being closed. Clamped about the lower end of the tube is a band or strap 23, a corresponding band 24 being clamped about the upper end. These bands form the terminals of an accordion-like screen or filter bag F composed of a series of rings supporting a web or cloth of proper mesh to freely allow the air to strain therethrough, but intercept the cotton (and any dust and other particles held in suspension by the inrushing air). The filtered air passes through the openings 22 onward through the pipe 1 to the vacuum pump, the cotton (and impurities) dropping into the hopper R' and receptacle R. When a sufficient quantity of the cotton has accumulated, the operator allows the same to be discharged through the door 13.

The operation of the invention will be readily understood from the description. The vacuum pump being started, and the valves a with which the branches of the couplings 4 are provided being turned to open position, the operators pass the nozzles of their several tools or suction-heads T in close proximity to the cotton-boll, when the inrush of atmospheric air into the vacuum produced in the pipe-line or hose 5 brushes past the cotton, severing the same from its boll and carrying it across the intervening space between the cotton and nozzle, through the nozzle and tool, into the hose 5, thence through the hose into the receptacle R. The filter or bag F intercepts the cotton, allowing the filtered air to pass through the eduction pipe 1 toward the pump, the cotton dropping to the bottom of the receptacle. The interior condition of the receptacle may be inspected at any time through the windows 8. Of course during the discharge of the cotton, the pump is either stopped, or the same may be cut off from the receptacle by any system of valves (not shown).

By referring to Figs. 2 and 3, it will be noted that the air charged with cotton and impurities is directed out of range of the filter F, the latter being raised above the direction which the currents emerging out of the nozzles 7, may take, so as not to be in danger of deterioration by the impact of such currents.

Having described my invention, what I claim is:—

1. In a vacuum cotton picking system, the combination of a receptacle, a suction-head in operative connection therewith adapted to be placed in proximity to the cotton on the boll, vacuum-producing means for drawing atmospheric air across the cotton and into the suction-head whereby the cotton is severed from the boll and carried into the head, means for conducting the cotton-laden current into the receptacle and directing it toward the bottom thereof, means for conducting the air out of the receptacle, and a filter or screen depending from the roof of the receptacle and positioned out of the range of the cotton-laden currents projected into the receptacle 2. In combination with a receptacle having an air eduction pipe leading therefrom, a peripherally slotted or open tube communicating at one end with said eduction pipe, and a filter or screen encompassing said tube whereby the air is free to pass out of the receptacle into the eduction pipe, and solid bodies are intercepted by said filter.

3. In combination with a cotton-picking vacuum-receptacle having an eduction pipe leading from the roof thereof, a tube closed at the bottom and open along its peripheral walls depending from the roof of the receptacle, and communicating with said eduction pipe, bands clamped about the upper and lower ends of the tube, and an accordion-like filter or screen disposed loosely around the tube between the bands.

4. In combination with a vacuum-receptacle, means for conducting the air out of the receptacle, a screen or filter for intercepting the solid particles, and means for directing the charged air into the receptacle in directions out of range of the screen.

5. In combination with a vacuum receptacle, a series of air projecting nozzles directing the air toward the bottom of the receptacle, and a central screen depending from the roof of the receptacle, and terminating at a point out of range of the said currents, whereby impact with the latter is avoided.

In testimony whereof I affix my signature, in presence of two witnesses.

JOHN STROTHER THURMAN.

Witnesses:
EMIL STAREK,
W. W. CONKLIN.